United States Patent [19]

Uchida et al.

[11] Patent Number: 5,082,298

[45] Date of Patent: Jan. 21, 1992

[54] STEEL LAMINATE GASKET WITH SEAL PROTECTING MEMBER

[75] Inventors: Tatsuro Uchida; Yoshio Yamada, both of Tokyo, Japan

[73] Assignee: Ishikawa Gasket Co., Ltd., Tokyo, Japan

[21] Appl. No.: 302,535

[22] Filed: Jan. 26, 1989

[30] Foreign Application Priority Data

Feb. 1, 1988 [JP] Japan ............... 63-12261[U]
Feb. 19, 1988 [JP] Japan ............... 63-20827[U]
Apr. 20, 1988 [JP] Japan ............... 63-53125[U]

[51] Int. Cl.$^5$ ............................................. F16J 15/08
[52] U.S. Cl. ........................ 277/235 B; 277/235 R; 277/236
[58] Field of Search ............ 277/227, 235 R, 235 A, 277/235 B, 236, 232, 233, 234

[56] References Cited

U.S. PATENT DOCUMENTS

| | | | |
|---|---|---|---|
| 1,928,585 | 9/1933 | Balfe | 277/235 B |
| 1,985,473 | 12/1934 | Victor | 277/235 B |
| 2,034,610 | 3/1936 | Dickson | 277/235 B X |
| 2,170,363 | 8/1939 | Balfe | 277/227 |
| 3,352,564 | 11/1967 | Johnson | 277/235 B |
| 3,567,234 | 3/1971 | Skrycki | 277/235 B |
| 4,714,260 | 12/1987 | Udagawa | 277/235 B |
| 4,759,585 | 7/1988 | Udagawa | 277/235 B |
| 4,807,892 | 2/1989 | Udagawa | 277/235 B |

*Primary Examiner*—Thomas B. Will
*Assistant Examiner*—Daniel G. DePumpo
*Attorney, Agent, or Firm*—Kanesaka and Takeuchi

[57] ABSTRACT

A steel laminate gasket of the invention is used for an internal combustion engine having at least one hole to be sealed. The gasket comprises first and second plates for constituting the steel laminate gasket, a sealing device formed around holes of the first and second plates, and at least one seal protecting member provided at a part of a peripheral portion of the gasket near the holes of the first and second plates. When the gasket is tightened, the seal protecting member receives a part of the tightening force applied to the sealing means to thereby protect the sealing means.

19 Claims, 4 Drawing Sheets

STEEL LAMINATE GASKET WITH SEAL PROTECTING MEMBER

BACKGROUND OF THE INVENTION AND RELATED ART STATEMENT

The present invention relates to a steel laminate gasket with a seal protecting member at an outer periphery of the gasket adjacent a hole of an engine.

A gasket is installed between two engine parts to seal a hole of the engine parts. In order to securely seal around the hole, the gasket is provided with sealing means around the hole, which provides high surface pressure when the gasket is tightened.

When an engine is operated, the engine together with the gasket vibrates, wherein the vibration is especially severe at a periphery of the engine, i.e. a periphery of a cylinder head. Therefore, a gasket, especially a cylinder head gasket receives a severe vibration at the periphery thereof. Due to the vibration, sealing pressure applied against the sealing means around the hole changes repeatedly. As a result, when the gasket is used for a long period of time, creep relaxation occurs at the sealing means, whereby fluid may leak from the hole.

In a gasket, there has been proposed no means to prevent creep relaxation of sealing means due to vibration of an engine, especially a cylinder head.

Accordingly, one object of the present invention is to provide a steel laminate gasket, in which durability at a sealing portion around a hole is enhanced.

Another object of the present invention is to provide a steel laminate gasket as stated above, which can substantially prevent creep relaxation of sealing means of a gasket due to vibration of an engine.

A further object of the present invention is to provide a steel laminate gasket as stated above, which can effectively reduce vibration of the engine at the periphery thereof.

A still further object of the present invention is to provide a steel laminate gasket as stated above, which can be easily and economically manufactured.

Further objects and advantages of the invention will be apparent from the following description of the invention.

SUMMARY OF THE INVENTION

In accordance with the present invention, a steel laminate gasket is installed in an internal combustion engine having at least one hole to be sealed. The gasket comprises first and second plates for constituting the steel laminate gasket, sealing means formed around holes of the first and second plates for sealing around the same, and at least one seal protecting member provided at a part of a peripheral portion of the gasket near the hole of the engine. When the gasket is tightened, the seal protecting member receives a part of the tightening force applied to the sealing means to thereby protect the sealing means.

Preferably, the seal protecting member is a metal plate and is attached to one of the first and second plates. The seal protecting member may be placed above the first or second plate or between the first and second plates.

The seal protecting member may have a U-shape in cross section. In this case, the first and second plates are held in a space of the U-shaped seal protecting member.

The seal protecting member may be integrally formed with one of the first and second plates. In this case, the seal protecting member is bent and situated above the other of the first and second plates.

The seal protecting member may be a rectangular form. However, an inner portion of the seal protecting member facing the sealing means may be curved along the sealing means. If desired, a plurality of the seal protecting members may surround one sealing means.

DETAILED DESCRIPTION OF PREFERRED EMBODIMENTS

Figure 1:
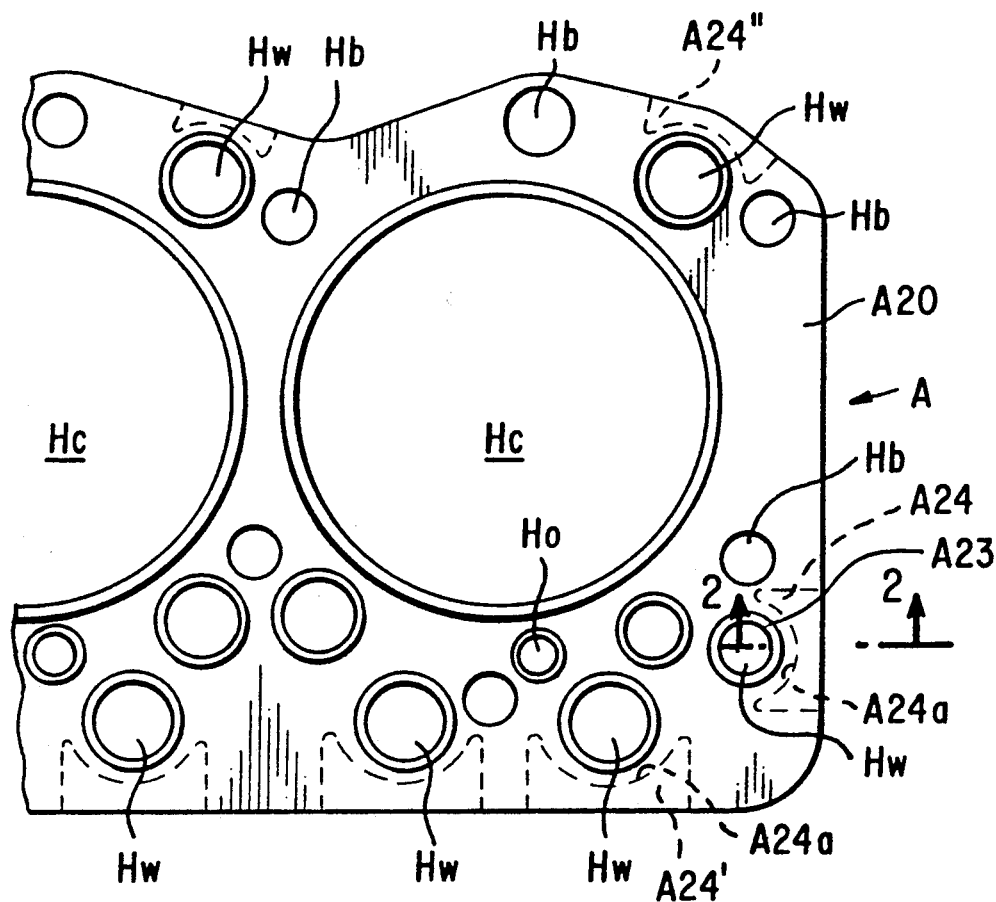
FIG. 1 is a partial plan view of a first embodiment of a steel laminate gasket of the invention.
Figure 2:
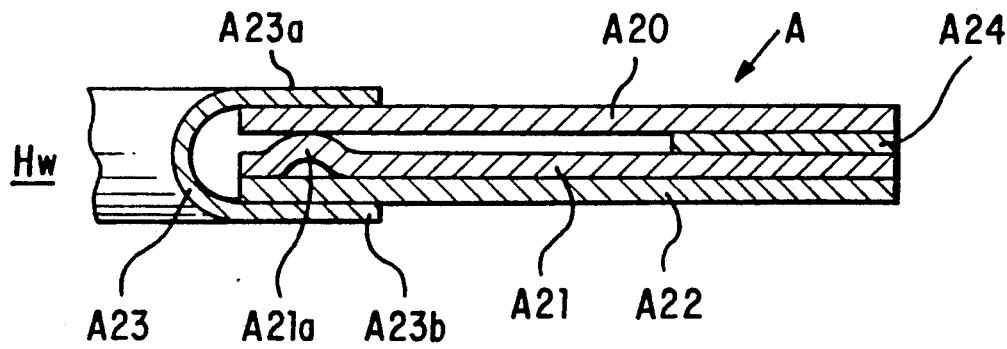
FIG. 2 is an enlarged section view taken along a line 2—2 in FIG. 1.

Referring to FIGS. 1 and 2, a first embodiment A of a steel laminate gasket of the present invention is shown. The gasket A is a cylinder head gasket and includes cylinder holes Hc, water holes Hw, oil holes Ho, bolt holes Hb and so on, as in the conventional gasket.

In the present invention, sealing mechanisms for the cylinder holes Hc are immaterial. Any kind of sealing mechanisms suitable for a steel laminate gasket may be employed. Therefore, explanation about the sealing mechanism for the cylinder hole Hc is omitted.

Also, sealing mechanisms for fluid holes, such as water holes Hw and oil holes Ho, are not important. However, the structure of the steel laminate gasket of the invention changes in accordance with the sealing mechanisms of the fluid hole. Therefore, the sealing mechanisms of the fluid holes are explained as illustration.

As shown in FIGS. 1 and 2, the steel laminate gasket A of the invention comprises an upper plate A20, a lower plate A22 and an inner plate A21 situated between the upper and lower plates A20, A22. The inner plate A21 is provided with a bead A21a around the water hole Hw. Also, a grommet A23 having an upper flange A23a and a lower flange A23b is installed around the water hole Hw. The upper flange A23a is located above the upper plate A20, while the lower flange A23b is located under the lower plate A22. The grommet A23 and the bead A21a constitute a water hole sealing mechanism.

In the gasket A, a seal protecting plate A24 is situated between the plates A20, A21. The plate A24 has an inner portion A24a to partly surround the grommet A23 and is located on a periphery of the gasket. The plate A24 is fixed to the inner plate A21 by means of spot welding. The shape and size of the plate A24 may be slightly changed based on the size and location of the fluid hole as shown at A24' and A24".

When the gasket A is situated between the cylinder head and cylinder block (both not shown) and is tightened by means of bolts (not shown), tightening pressure is substantially evenly applied onto the gasket A. In this case, since the water hole sealing mechanism formed by the grommet A23 and the bead A21a is thicker than other portions, high sealing pressure is obtained therearound, which seals around the water hole Hw.

In this situation, since the seal protecting plate A24 is situated at the periphery of the gasket A, tightening pressure, which is less than the pressure at the water hole sealing mechanism but greater than that at a portion between the water hole sealing mechanism and the plate A24, is applied to the plate A24. Namely, a part of the sealing pressure applied to the water hole sealing mechanism is applied to the plate A24.

Accordingly, when an engine is operated, vibration of the cylinder head at the periphery thereof is significantly reduced. As a result, creep relaxation of the gasket at the water hole sealing mechanism is substantially prevented. In this respect, if the plate A24 is not installed in the gasket, the cylinder head vibrates significantly at a periphery away from the tightening bolt, i.e. areas where the plate A24 is installed, which causes creep relaxation of the water hole sealing mechanism. However, in the present invention, the vibration of the cylinder head is significantly reduced, so that creep relaxation is substantially prevented.

In the gasket A, the seal protecting plate A24 is installed adjacent the water hole Hw. However, the seal protecting plate A24 may be provided adjacent any kinds of holes with sealing mechanisms, such as cylinder holes.

Figure 3:
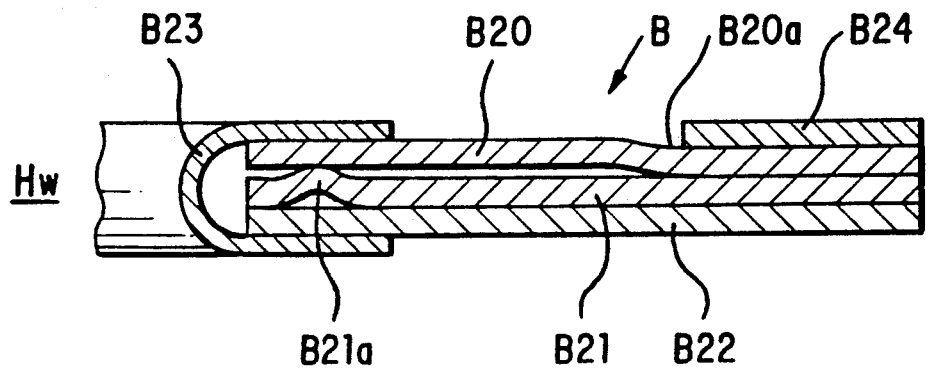
FIG. 3 is a section view, similar to FIG. 2, of a second embodiment of the invention.

FIG. 3 shows a second embodiment B of a steel laminate gasket of the invention. The gasket B comprises an upper plate B20, an inner plate B21 with a bead B21a, a lower plate B22, a grommet B23 and a seal protecting plate B24, similar to the gasket A. However, the seal protecting plate B24 is situated above the upper plate B20. Since the inner plate B21 is provided with the bead B21a, a dent B20a contacting the inner plate B21 is formed on the upper plate B20. The seal protecting plate B24 is situated on the dent B20a. Therefore, in case the plate B24 is compressed when the gasket is tightened, it does not affect the sealing ability around the water hole Hw. The gasket B operates as in the gasket A.

Figure 4:
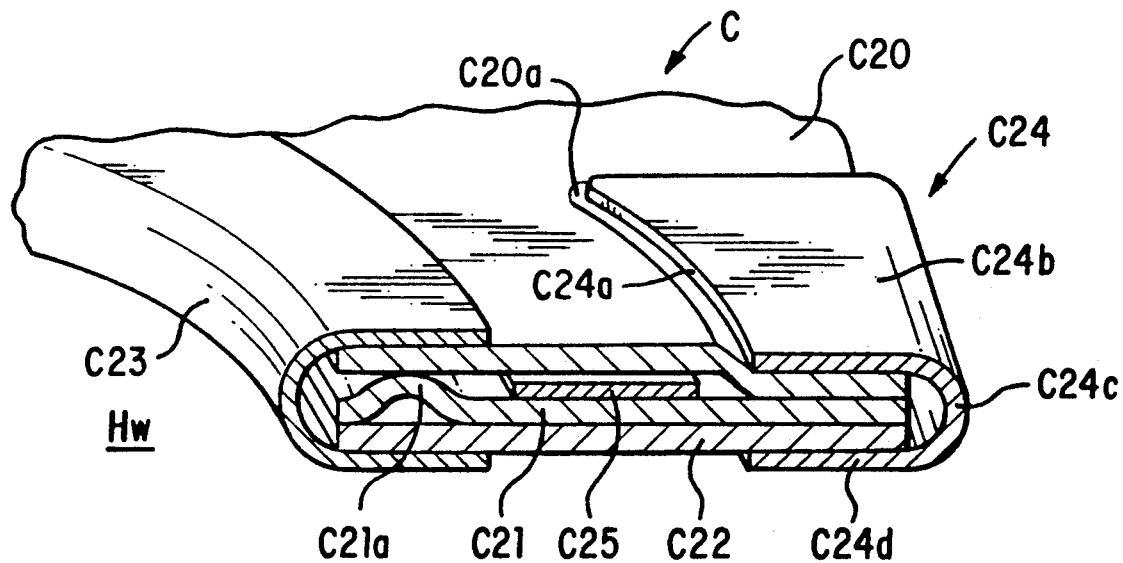
FIG. 4 is a perspective section view of a third embodiment of the invention.

FIG. 4 shows a third embodiment C of a steel laminate gasket of the invention. The gasket C comprises an upper plate C20 with a dent C20a, an inner plate C21 with a bead C21a, a lower plate C22, and a grommet C23, similar to the gasket A. The gasket C further includes an inner plate C25 between the plates C20, C21, which operates as a surface pressure regulation plate for the bead C21a.

In the gasket C, a seal protecting plate C24 is formed of an upper portion C24b, a curved portion C24c and a lower portion C24d. The upper portion C24b is provided with an inner portion C24a curving along the grommet C23. The upper portion C24b is located in the dent C20a of the upper plate C20, and the lower portion C24d is located under the lower plate C22. The plates C20, C21, C22 are interposed between the upper and lower portions C24b, C24d of the seal protecting plate C24 to hold the plates together.

In the gasket C, the actual thickness at the grommet C23 (not counting the height of the bead C21a) is higher than the thickness at the seal protecting plate C24. The height of the gasket C at a portion between the grommet C23 and the plate C24 is the lowest. Therefore, a part of tightening pressure applied to the grommet C23 is applied to the plate C24. The gasket C operates as in the gasket A.

Figure 5:
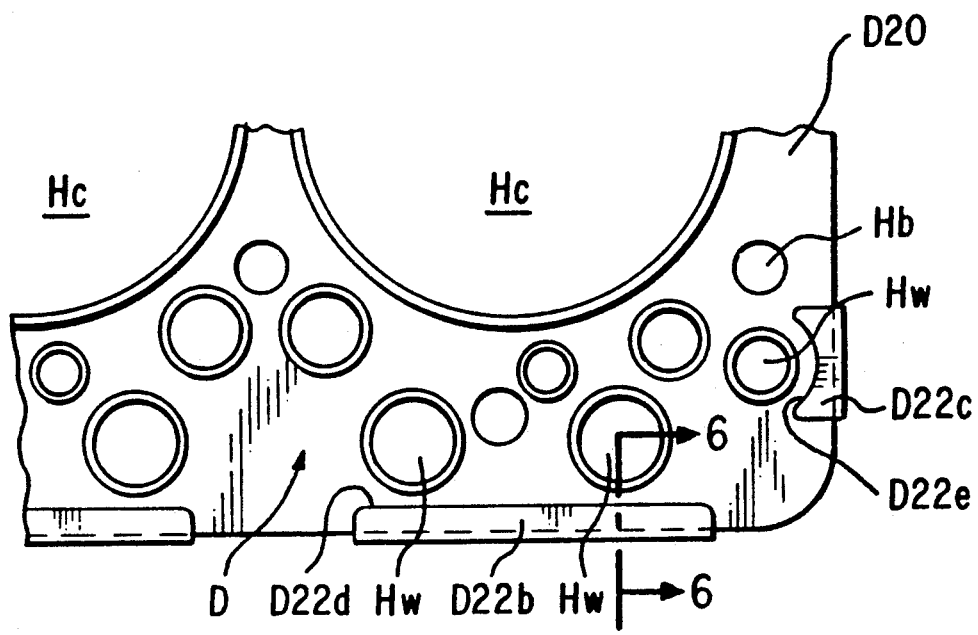
FIG. 5 is a partial plan view of a fourth embodiment of the invention.
Figure 6:
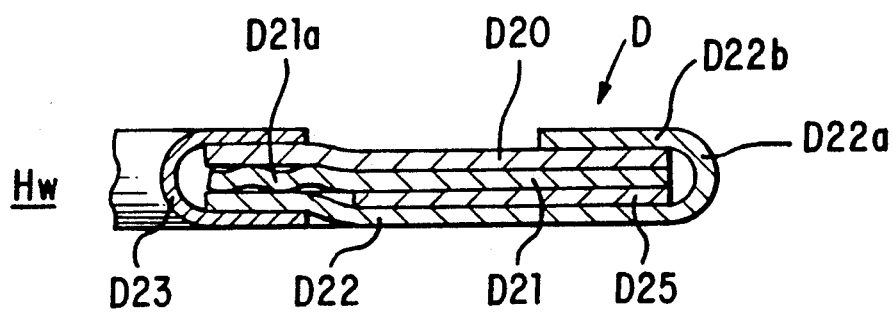
FIG. 6 is an enlarged section view taken along a line 6—6 in FIG. 5, in which a condition where the gasket is tightened is shown.

FIGS. 5 and 6 show a fourth embodiment D of a steel laminate gasket of the invention, wherein the gasket D is, in FIG. 6, shown in a compressed condition. The gasket D comprises an upper plate D20, an inner plate D21 with a bead D21a, lower plate D22, and a grommet D23, as in the gasket A. However, the gasket D further includes an inner plate D25.

Also, the lower plate D22 is provided with curved portions D22a and flanges D22b, D22c situated above the upper plate D20. The flanges D22b, D22c operate as seal protecting plates in the gasket D. The flange D22b has a straight inner edge D22d and extends sufficiently such that the flange D22b operates as a seal protecting plate for two water holes Hw. The flange D22c has a curved inner edge D22e and operates as a seal protecting plate for one water hole Hw.

In the gasket D, the upper plate D20 is retained by the flanges of the lower plate D22, while the inner plates are held between the upper and lower plates. Therefore, the plates need not be connected together after assembly. When the gasket D is tightened, the bead D21a forms a plurality of corrugated beads as shown in FIG. 6 to seal around the water hole Hw, as in the gasket A.

Figure 7:
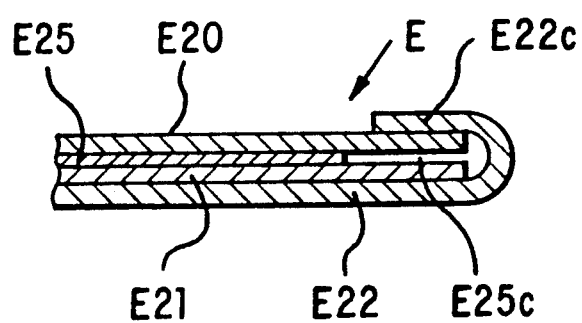
FIG. 7 is a section view, similar to FIG. 2, of a fifth embodiment of the invention.

FIG. 7 shows a fifth embodiment E of a steel laminate gasket of the invention. The gasket E comprises an upper plate E20, an inner plate E21 with a bead E21a (not shown), a lower plate E22 with a flange E22c and a grommet (not shown), as in the gasket D. In the gasket E, an inner plate E25 situated between the upper plate E20 and inner plate E21 has a cutout portion E25c corresponding to the flange E22c. The thickness of the plate E25 is thinner than the plate E22. As a result, when the gasket E is tightened, surface pressure at the flange area becomes stronger than that at an area outside the cutout portion E25c. The gasket E operates as in the gasket A.

Figure 8:
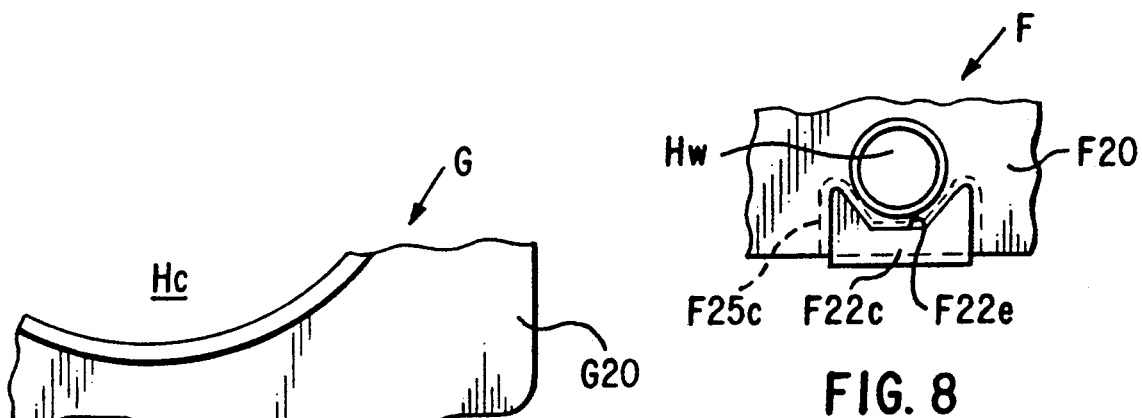
FIGS. 8-10 are partial plan views of sixth to eighth embodiments of a steel laminate gasket of the present invention.

FIG. 8 shows a sixth embodiment F of a steel laminate gasket of the invention. The gasket F comprises a plurality of plates, as in the gasket E, and includes an inner plate F25 (not shown) with a cutout portion F25c and a flange F22c similar to the flange E22c (D22c). Although the flange D22c has the curved inner edge D22e, the flange F22c includes an inner edge F22e formed by straight lines. The flange F22c operates as in the flange D22c.

Figure 9:
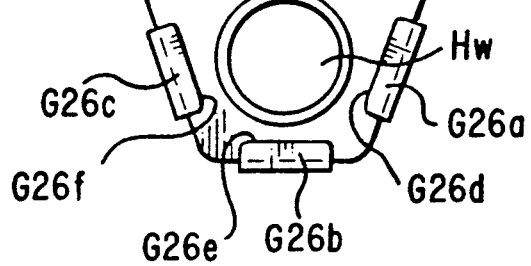
Figure 10:
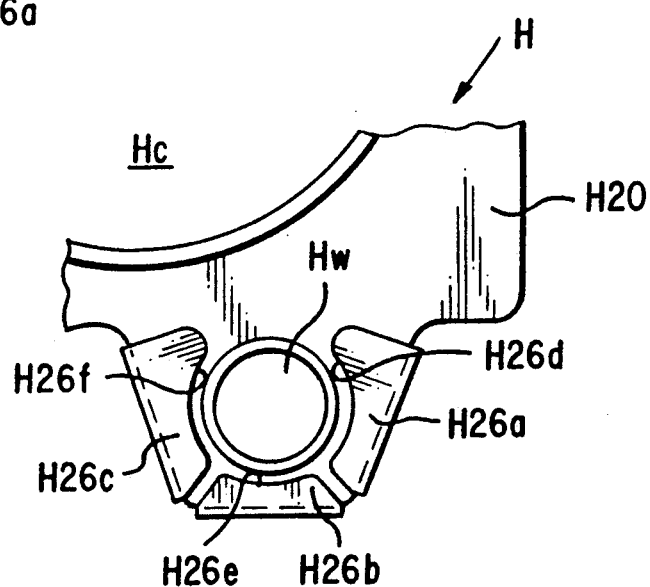

FIGS. 9 and 10 show seventh and eighth embodiments G and H of the gasket of the invention, wherein water hole Hw is formed outside a main body of an engine. In this structure, it is preferable to surround the water hole Hw at three sides by means of the seal protecting plates.

In the gasket G, a lower plate G22 (not shown) is provided with flanges G26a, G26b, G26c, which are turned and situated above an upper plate G20 to operate as the seal protecting plates. The flanges G26a, G26b, G26c have straight inner edges G26d, G26e, G26f respectively.

In the gasket H, a lower plate H22 (not shown) is provided with flanges H26a, H26b, H26c, which are turned and situated above an upper plate H20 to operate as the seal protecting plates. The flanges H26a, H26b, H26c have curved inner edges H26d, H26e, H26f respectively.

In the gaskets G, H, sealing means around the water hole Hw are protected by the seal protecting plates.

Figure 11:
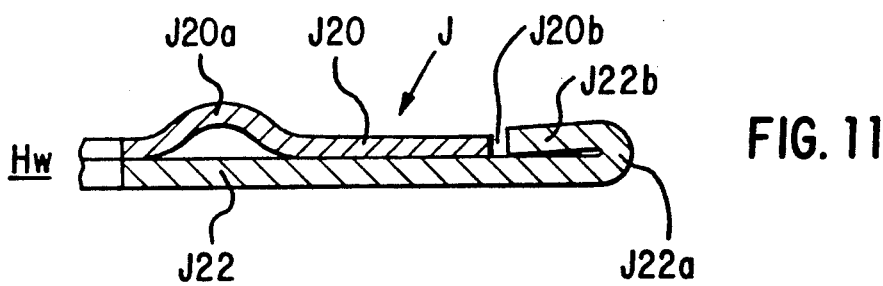
FIGS. 11 and 12 are enlarged section views, similar to FIG. 2, of ninth and tenth embodiments of a steel laminate gasket of the invention.

FIG. 11 shows a ninth embodiment J of a steel laminate gasket of the invention. The gasket J comprises an upper plate J20 with a bead J20a, and a lower plate J22 with a curved portion J22a and a flange J22b. The upper plate J20 further includes a cutout portion J20b so that the flange J22b is located in the cutout portion J20b without overlapping the upper plate J20. Namely, the flange J22b is directly placed over the plate J22.

When the gasket J is tightened, the bead J20a operates to seal around the water hole Hw, and the flange J22b receives a part of the tightening pressure applied to the bead J20a. The gasket J operates as in the gasket A.

Figure 12:
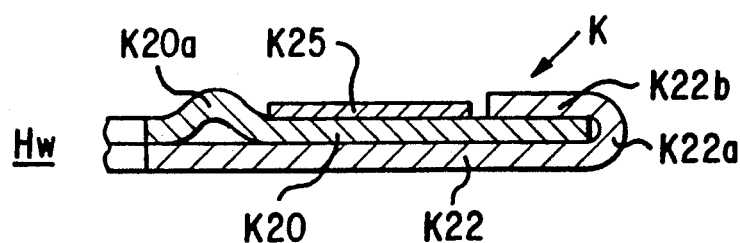

FIG. 12 shows a tenth embodiment K of a steel laminate gasket of the invention. The gasket K comprises an upper plate K20 with a bead K20a, a lower plate K22 with a curved portion K22a and a flange K22b, and a surface pressure regulation plate K25 for the bead K20a situated above the upper plate K20. The flange K22b is situated above the upper plate K20 but does not overlap the surface pressure regulation plate K25.

When the gasket K is tightened, the bead K20a operates to seal around the water hole Hw, and the flange K22b receives a part of the tightening pressure applied to the bead K20a. The tightening pressure applied to the bead K20a is controlled by the plate K25. The gasket K operates as in the gasket A.

In the gasket of the present invention, at least one seal protecting member is situated at a periphery of the gasket adjacent sealing means for a hole to be sealed. When the gasket is tightened, tightening pressure formed on the sealing means becomes suitable pressure for sealing around the hole to be sealed, wherein a part of the tightening pressure on the sealing means is supported by the seal protecting member. Therefore, the tightening pressure at an area between the seal protecting member and the sealing means is the lowest.

In the gasket, since a part of the tightening pressure on the sealing means is supported by the seal protecting member, when an engine, particularly a cylinder head, vibrates, the sealing means is not damaged. Therefore, creep relaxation of the sealing means is substantially prevented.

While the invention has been explained with reference to the specific embodiments of the invention, the explanation is illustrative and the invention is limited only by the appended claims.

What is claimed is:

1. A steel laminate gasket for an internal combustion engine having at least one hole to be sealed and an outer peripheral portion, comprising,
   first and second plates for constituting the steel laminate gasket, each said plate having a hole corresponding to the hole of the engine and an outer periphery to define the outer peripheral portion of the gasket,
   sealing means formed around the holes of the first and second plates for sealing therearound when the gasket is tightened, and
   at least one seal protecting member situated on a part of the outer peripheral portion of the gasket, said seal protecting member being arranged adjacent to and at a predetermined distance away from the sealing means to substantially surround the sealing means at a side facing the outer peripheral portion of the gasket, said seal protecting member being non-continuous around the outer peripheral portion of the gasket, said seal protecting member including an inner portion facing the sealing means, said inner portion having a contour to partly surround the sealing means, a thickness of the gasket on the seal protecting member, when the gasket is tightened, being thicker than a thickness on a portion of the gasket between the sealing means and the seal protecting member so that said seal protecting member when the gasket is tightened, receives a part of the tightening pressure applied to the sealing means to thereby securely seal around the holes of the first and second plates by the sealing means and to prevent creep relaxation of the sealing means due to vibration of the gasket when the engine is operated.

2. A steel laminate gasket according to claim 1, wherein the thickness of the gasket on the seal protecting member is thicker than that on the sealing means.

3. A steel laminate gasket according to claim 2, wherein the seal protecting member is a metal plate attached to one of the first and second plates.

4. A steel laminate gasket according to claim 3, wherein said seal protecting member is attached above the first plate.

5. A steel laminate gasket according to claim 3, wherein said seal protecting member is situated between the first and second plates.

6. A steel laminate gasket according to claim 1, wherein said inner portion curves along the sealing means.

7. A steel laminate gasket according to claim 2, wherein said seal protecting member is made of metal and has a U-shape in cross section, said seal protecting member partly surrounding the first and second plates.

8. A steel laminate gasket according to claim 7, wherein said seal protecting member has an upper portion situated above the first plate, said upper portion having an inner portion facing the sealing means, and partly curving along the sealing means.

9. A steel laminate gasket according to claim 1, wherein said seal protecting member is integrally formed with one of the first and second plates, said seal protecting member being situated above the other of the first and second plates by turning one of said first and second plates.

10. A steel laminate gasket according to claim 9, wherein inner portion partly curves along the sealing means.

11. A steel laminate gasket according to claim 9, further including at least one inner plate situated between the first and second plates.

12. A steel laminate gasket according to claim 11, wherein said at least one inner plate includes a cutout portion having a size larger than that of the seal protecting member so that the inner plate does not overlap the seal protecting member.

13. A steel laminate gasket according to claim 10, further including a surface pressure regulation plate situated above the first plate, said surface pressure regulation plate having a cutout portion so that the seal protecting member is located therein without overlapping the surface pressure regulation plate, the thickness of the surface pressure regulation plate being thinner than that of the seal protecting member.

14. A steel laminate gasket according to claim 9, wherein a plurality of seal protecting members surrounds the hole of the gasket to be sealed.

15. A steel laminate gasket according to claim 1, wherein said seal protecting member is integrally formed with the first plate, said second plate having a cutout portion, said seal protecting member being bent to be located above the first plate at the side of the second plate so that the seal protecting member is located in the cutout portion.

16. A steel laminate gasket according to claim 15, wherein said second plate is provided with a bead for constituting the sealing means.

17. A steel laminate gasket according to claim 12, wherein said seal protecting member includes an inner portion facing the sealing means, said inner portion partly curving along the sealing means.

18. A steel laminate gasket according to claim 1, wherein said sealing means is a bead formed around the holes of the first and second plates.

19. A steel laminate gasket for an internal combustion engine having at least one fluid hole to be sealed and an outer peripheral portion, comprising, first and second plates for constituting the steel laminate gasket, each said plate having a hole corresponding to the fluid hole of the engine and an outer periphery to define the outer peripheral portion of the gasket, sealing means formed around the holes of the first and second plates for sealing therearound when the gasket is tightened, and at least one seal protecting member situated on a part of the outer peripheral portion of the gasket, said sealing protecting member being arranged adjacent to and at a predetermined distance away from the sealing means to substantially surround the sealing means at a side facing the outer peripheral portion of the gasket said seal protecting member extending non-continuously around the outer peripheral portion of the gasket said seal protecting member including an inner portion facing the sealing means, said inner portion partly curving along the sealing means, a thickness of the gasket on the seal protecting member, when the gasket is tightened, being thicker than a thickness on a portion of the gasket between the sealing means and the seal protecting member so that said seal protecting member, when the gasket is tightened, receives a part of the tightening pressure applied to the sealing means, tightening pressure on the seal protecting member being weaker than tightening pressure on the sealing means but stronger than tightening pressure on the portion of the gasket between the sealing means and the seal protecting member to thereby securely seal around the holes of the first and second plates by the sealing means and to prevent creep relaxation of the sealing means due to vibration of the gasket when the engine is operated.

* * * * *

UNITED STATES PATENT AND TRADEMARK OFFICE
CERTIFICATE OF CORRECTION

PATENT NO. : 5,082,298

DATED : January 21, 1992

INVENTOR(S) : Tatsuro Uchida et al

It is certified that error appears in the above-identified patent and that said Letters Patent is hereby corrected as shown below:

Columns 7-8, claims section.

Column 8, line 10, change "gasket" to --gasket,--;

line 12, change "gasket" to --gasket,--.

Signed and Sealed this

Thirteenth Day of April, 1993

Attest:

STEPHEN G. KUNIN

*Attesting Officer*  *Acting Commissioner of Patents and Trademarks*